United States Patent
Danz et al.

(10) Patent No.: US 6,529,782 B1
(45) Date of Patent: Mar. 4, 2003

(54) CONTROL METHOD WITH A CHARACTERISTIC CURVE DEFINED BY INTERPOLATION POINTS

(75) Inventors: Wolfgang Danz, Friedrichshafen (DE); Johannes Fischer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/509,463

(22) PCT Filed: Nov. 2, 1998

(86) PCT No.: PCT/EP98/06928

§ 371 (c)(1), (2), (4) Date: Mar. 28, 2000

(87) PCT Pub. No.: WO99/24879

PCT Pub. Date: May 20, 1999

(30) Foreign Application Priority Data

Nov. 6, 1997 (DE) .......................................... 197 49 056

(51) Int. Cl.[7] .............................................. G05B 13/02
(52) U.S. Cl. .............................. 700/34; 700/33; 701/60
(58) Field of Search .............................. 700/28, 33, 46; 701/51, 52, 87, 58, 60

(56) References Cited

U.S. PATENT DOCUMENTS

| | | | |
|---|---|---|---|
| 4,213,175 A | | 7/1980 | Kurihara |
| 4,648,024 A | * | 3/1987 | Kato et al. ................... 364/169 |
| 5,063,510 A | * | 11/1991 | Jurgens et al. ................. 701/60 |
| 5,527,231 A | * | 6/1996 | Seidel et al. ................... 477/46 |
| 5,625,551 A | | 4/1997 | Mitarai et al. ............... 364/149 |

FOREIGN PATENT DOCUMENTS

| | | |
|---|---|---|
| DE | 35 02 873 A | 7/1986 |
| DE | 37 31 983 A1 | 4/1989 |
| DE | 40 16 018 C | 8/1991 |
| DE | 196 03 091 C | 7/1997 |
| JP | 59-222652 A | * 12/1984 |

* cited by examiner

Primary Examiner—Paul P. Gordon
(74) Attorney, Agent, or Firm—Davis & Bujold, P.L.L.C.

(57) ABSTRACT

The invention is based on a control method having a characteristic curve (1) defined by interpolation points (3, 4, 5, 6, 7), the characteristic curve being stored in an electronic processing unit. To control stability and with sufficient accuracy processes overridden by strong, time-variant disturbances, it is proposed that a characteristic line (1) is preset and adapted according to a system deviation and a ratio of the difference between a measured point (9) and an adjacent interpolation point (4, 5) and the difference between the two interpolation points (4, 5) adjacent to the measured point (9).

13 Claims, 1 Drawing Sheet

CONTROL METHOD WITH A CHARACTERISTIC CURVE DEFINED BY INTERPOLATION POINTS

BACKGROUND OF THE INVENTION

The invention relates to a control method with a characteristic line defined by interpolation points.

Processes overridden by strong, time-variant disturbances, in general, can be only insufficiently conducted by adding a linear regulator. To obtain the required excellence, there have to be used, as a rule, non-linear control loop structures and includes a pattern for disturbances. This often results in unstable situations. In practice, the disturbance pattern is mostly unknown and a finding is possible only at considerably expense, but often is also absolutely impossible.

In such cases, reference is had to a controlled standard of correcting variables on the basis of a stationary, empirical process pattern with a characteristic curve or a characteristic field without first taking into account the disturbances. The resulting guiding behavior is stationarily accurate for an undisturbed operation case and in the dynamic transition, very quick and yet stable. In case, disturbances occur stationarily unforeseeable deviations of s a greater or smaller magnitude, generate between the regulating variable and the command variable. Therefore, it has to be ensured, e.g. by limiting the correcting variables, that no critical operating states occur. Of course, it is no longer possible, in this case, sufficiently to meet the general requirements relative to stationary precision.

The invention is based on the problem of stably and with sufficient accuracy controlling a process that are overridden by strong, time-variant disturbances.

SUMMARY OF THE INVENTION

According to the invention, a control method is selected having a characteristic curve defined by interpolation points. The interpolation points can be empirical values obtained by testing, however they can also be arbitrarily preset, since they are adapted during the operation specifically in accordance with the system deviation of a correcting variable and a ratio of the difference between a measured point and an interpolation point and the difference between the two interpolation points adjacent to the measured point.

Correction values needed for the adjacent interpolation points are conveniently figured out from the following equations:

$$K_u = R_{abw} * [1-(x-x_u)/(x_o-x_u)]$$

and $$K_o = R_{abw} * [1-(x_o-x)/(x_o-x_u)]$$

wherein $K_o$, $K_u$ are correction values respectively for the lower and the upper interpolation points, x is an actual measured operating point on the characteristic curve and $x_o$, $x_u$ values of a closest upper or lower interpolation point based on the measured point. The new adapted characteristic curve results from the initial interpolation points plus the appertaining correction values.

To increase the stability of the method and lightly to load the processing unit, it is convenient to perform the adaptation with a scanning time of more than 20 milliseconds. The scanning time must, if need be, adapted to the prevailing method time constant. It is further advantageous to limit the adaptation range of the characteristic curve in which an appertaining sensor works linearly. This is simpler in a control than in a regulation.

According to another embodiment of the invention, the new interpolation points are preset in steps. Excessively great bounces are thereby prevented during the operation and the output variable of the control proceeds less hectically.

From the correction values conclusions can be drawn on the operating behavior. Thus, correction values can be used for diagnosis purposes when, e.g. they exceed the preset limit values. On the other hand, defined theoretical values can be preset in order to test the reaction of the systems.

The inventive control method is especially adequate for pressure control of an automatic transmission, in particular, one with continuously variable ratio. The hydraulic adjustment of the static friction force between two friction elements such as an alternate belt and bevel pulleys is overridden by numerous time-variant disturbances. It must be dynamically and stationarily ensured concerning the contact pressure of the bevel pulleys that the belt, such as a sliding link belt, in no case skids over the bevel pulleys. The bevel pulleys and mainly the belt would thereby be destroyed. In addition, the contact pressure force produced by a hydraulic pressure decisively influences the efficiency of the transmission and thus directly the fuel consumption of the driven motor vehicle. Therefore, in the control of the contact pressure a reinforced crucial point is that there be kept the stationary accuracy. The inventive control method satisfies the requirements in relation both to the stability of the control and to the accuracy.

When the correction value gives reason to conclude that an error exists in the system, e.g. when it exceeds a preset limit value, it is convenient to activate a substitute function of the transmission, such as an emergency program. When the current supply is switched off, e.g. when the ignition of an internal combustion engine is switched off or the current supply fails, it is further advantageous to store the data in a memory module (e.g. EEPROM, FLASH) in order that they are again available when restarting. During the new start, if the last adapted characteristic curve is used, a long-time adaptation of the characteristic curve is obtained during the service life.

The inventive control method can be used not only with characteristic curve but in the same manner with n-dimensional characteristic fields. The correction values of the interpolation points are separately figured out for each dimension.

BRIEF DESCRIPTION OF THE DRAWINGS

Other advantages result from the following description of the drawing. In the drawing are shown, byway of example, diagrams with characteristic curves for explanation of the invention. The specification and the claims contain numerous features in combination. The expert will conveniently regard the features separately and make with them logical added combination.

In the drawings.

DESCRIPTION OF THE PREFERRED EMBODIMENTS

Figure 1:
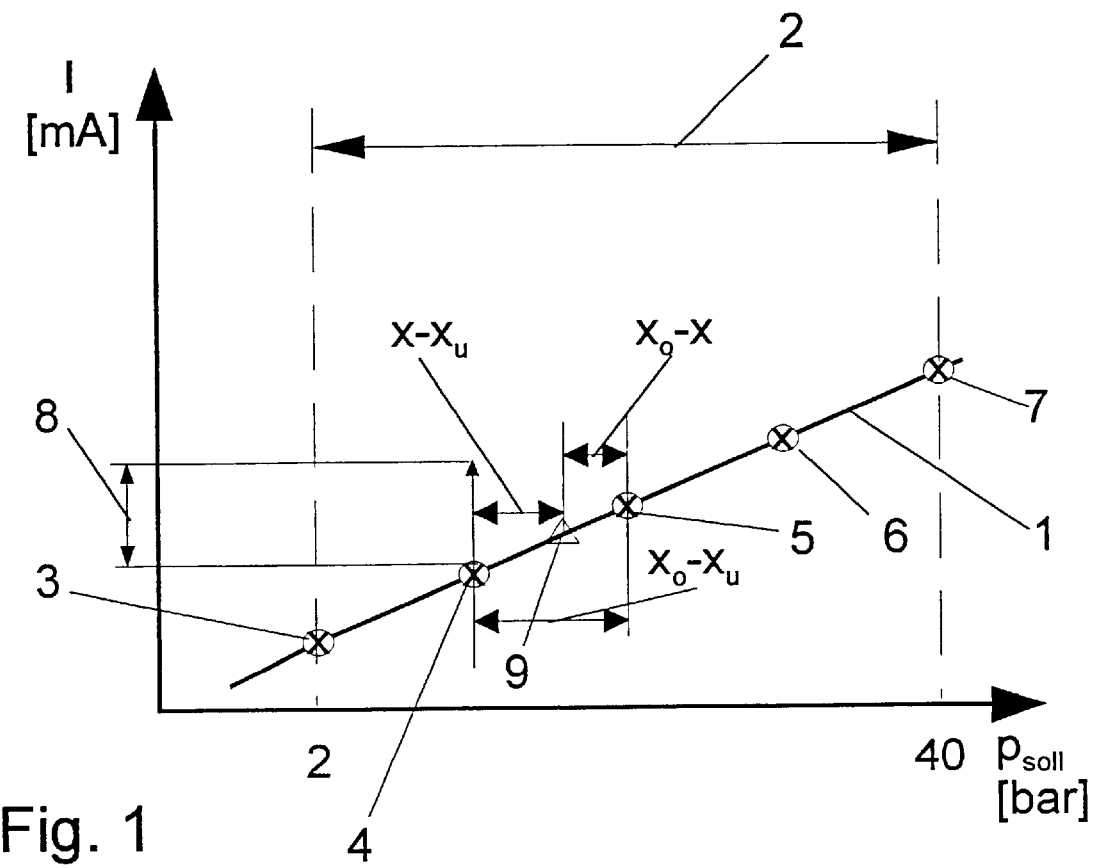
FIG. 1 is a diagram in which the appertaining current intensity of a magnetic valve is applied via a theoretical pressure.

In the diagram of FIG. 1 is plotted a characteristic curve 1 defined by interpolation points 3–7. It represents the relationship of a theoretical pressure measured in bar to a current intensity of a magnetic valve measured in mA such as utilizable in automatic transmissions with continuously variable ratio of motor vehicles. The interpolation points 3–7 can correspond to empirical values (measured values) or be arbitrarily assumed to begin with. They are stored in an electronic processing unit. A selected adaption range 2 comprises the pressure values 2 bar to 40 bar which is identical with the working range of a pressure sensor.

From a measured pressure value Pist the system deviation $p_{abw}=(p_{soil}-p_{ist})$ is figured out. Correction values 8 are figured out from the position of the measured point 9 on the characteristic curve 1 relative to the adjacent interpolation points 4 and 5 and the adjacent interpolation points 4 and 5 are adapted according to the calculated correction values 8.

Figure 2:
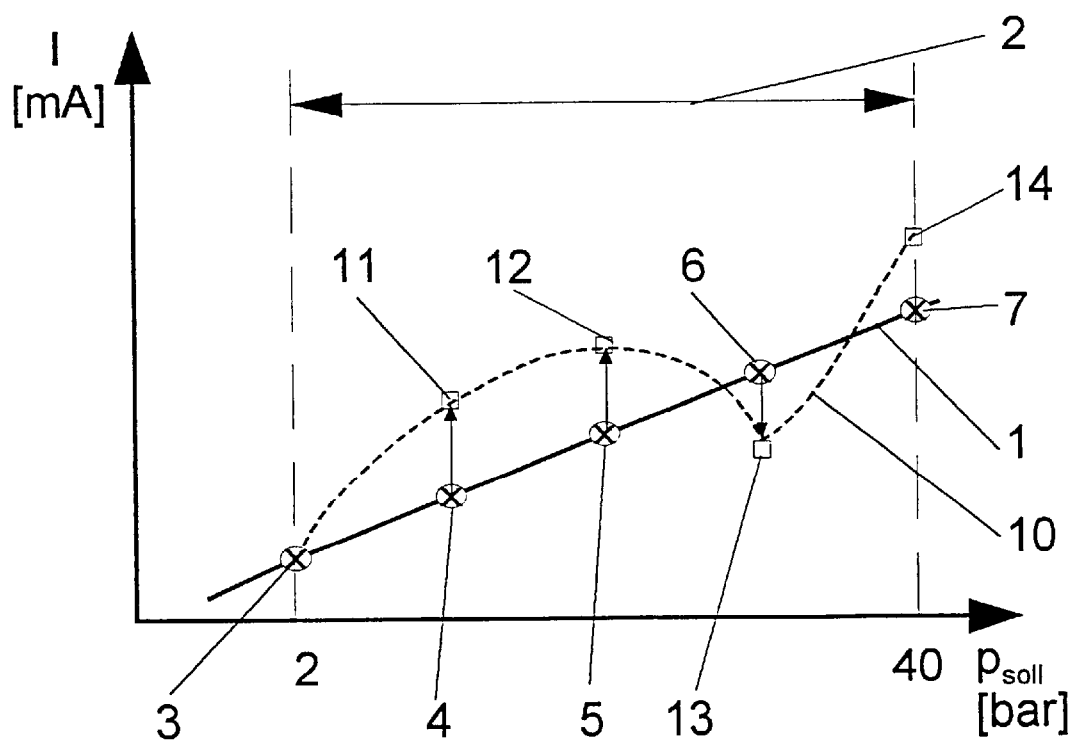
FIG. 2 is the same diagram with an adapted characteristic curve.

From the adapted interpolation points results an adapted characteristic curve 10 (FIG. 2) with adapted interpolation points 11, 12, 13, 14 on which is based the further control and which form the pont of reference for the next adaptation.

The last adapted characteristic curve is stored at the end of the operation of the motor vehicle and is used as output characteristic line when starting again.

| Reference numerals | |
|---|---|
| 1 characteristic curve | 8 correction value |
| 2 adaptation range | 9 measuring point |
| 3 interpolation point | 10 adapted characteristic curve |
| 4 interpolation point | 11 adapted interpolation point |
| 5 interpolation point | 12 adapted interpolation point |
| 6 interpolation point | 13 adapted interpolation point |
| 7 interpolation point | 14 adapted interpolation point |

What is claimed is:

1. A method used in an electronic processing unit having an adaptable characteristic curve (1) defined by interpolation points (3, 4, 5, 6, 7), stored in the electronic processing unit, the method comprising the steps of the characteristic curve (1) being preset and being adapted according to a system deviation and a ratio of the difference between a measured point (9) and the adjacent interpolation points (4, 5) and the difference between the two interpolation points (4, 5) adjacent to the measured point (9).

2. The control method according to claim 1, comprising adapting the interpolation points (4, 5) adjacent to a measured point (9) with a correction value (8) from the following equations:

$$K_N = R_{abw} * [1-(x-x_u)/(x_o-x_u)]$$

and $$K_o = R_{abw} * [1-(x_o-x)/(x_o-x_u)]$$

wherein $K_u$ and $K_o$ are respective correction values (8) for a lower interpolation point (5) and an upper interpolation point (5), x is an actual measured point (9) on the characteristic curve (1) and $x_o$ and $x_u$ are values of a closest higher and lower interpolation point (4, 5), respectively, based on a measured point (9), and $R_{abw}$ is an adaption step.

3. The control method according to claim 2, further comprising the step of using:

$$R_{abw}=x_d \cdot k$$

to performing the adaption step, where $x_d$ is the deviation between the actual value x and a target value and k is a calibration parameter.

4. The control method according to claim 1, further comprising the step of the control method scanning at ai scanning rate above 20 milliseconds.

5. The control method according to claim 1, further comprising the step of limiting a range (2) of adaptation of the characteristic curve (1), with the characteristic curve (1) corresponding to a working range of an appertaining measuring sensor.

6. The control method according to claim 1, further comprising the step of presetting new Interpolation point values (11, 12, 13, 14) for the control method in steps.

7. The control method according to claim 1, further comprising the step of using a correction value of (8) for diagnosis purposes and, when the correction value of (8) exceeds a preset limit value, concluding that an error in the control method exists.

8. The control method according to claim 7, further comprising the step of presetting defined theoretical values in order to test a system reaction.

9. The control method according to claim 1, further comprising the step of using the control method for pressure control of an automatic transmission which has a continuously variable ratio.

10. The control method according to claim 9, further comprising the step of activating a substitute function when the correction value (8) exceeds a preset limit value.

11. The control method according claim 1, further comprising the step of, following completion of the control method, storing a last adapted characteristic curve (10) for use as initial value when again starting r.

12. The control method according to claim 11, further comprising the step of storing the data in a memory module while a supply of current is switched off.

13. The control method according to claim 1, further comprising the step of calculating a n-dimensional characteristic field and a correction value (8) for each dimension.

* * * * *